Aug. 1, 1939.  A. C. SCHROEDER  2,168,001
ACCOUNTS REGISTER
Filed Oct. 3, 1938  2 Sheets-Sheet 1
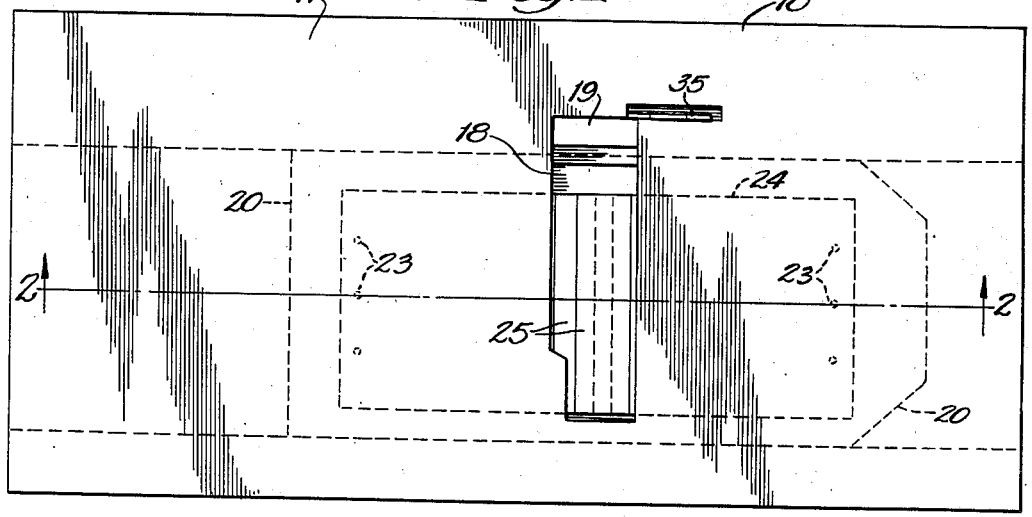
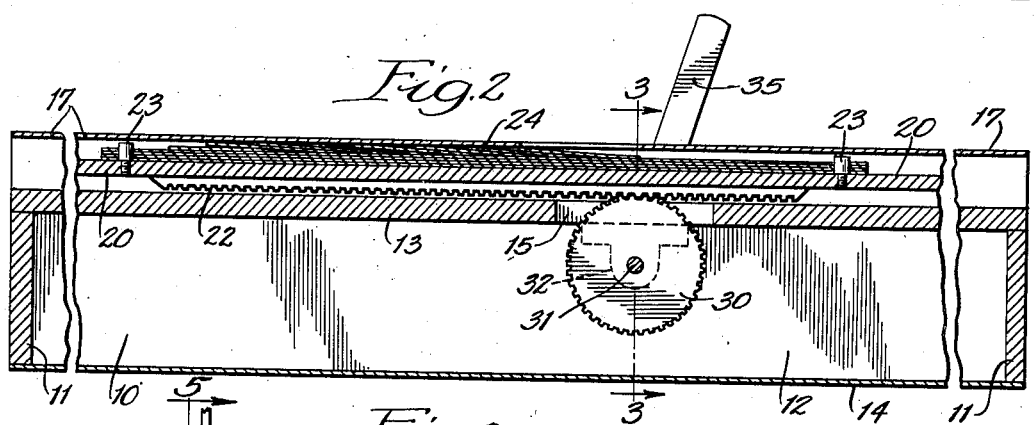
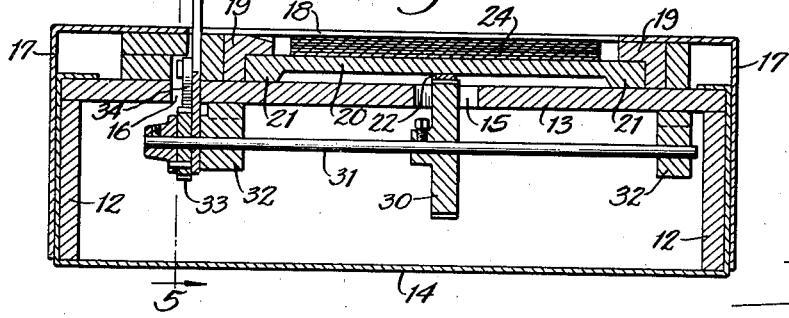
Inventor:
Arthur C. Schroeder,
By Casper W. Ooms
Attorney.

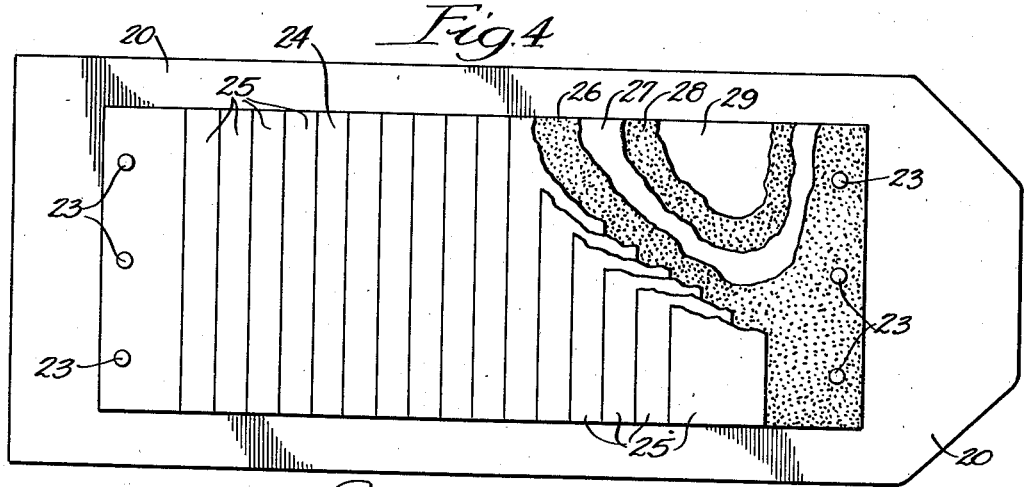
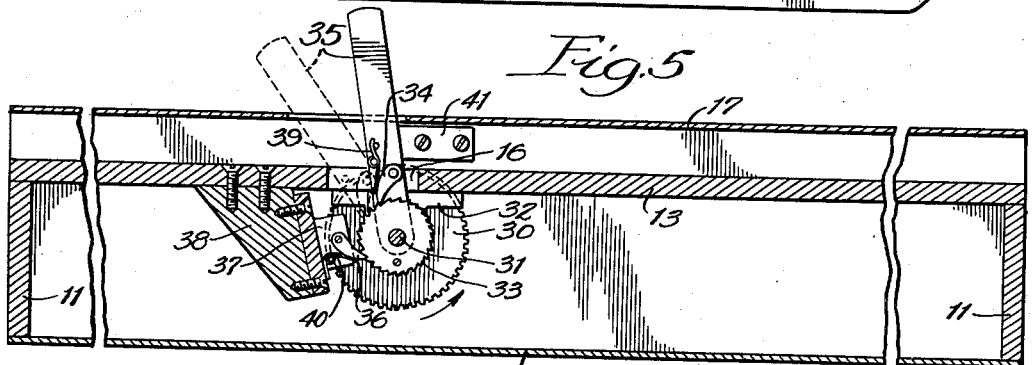
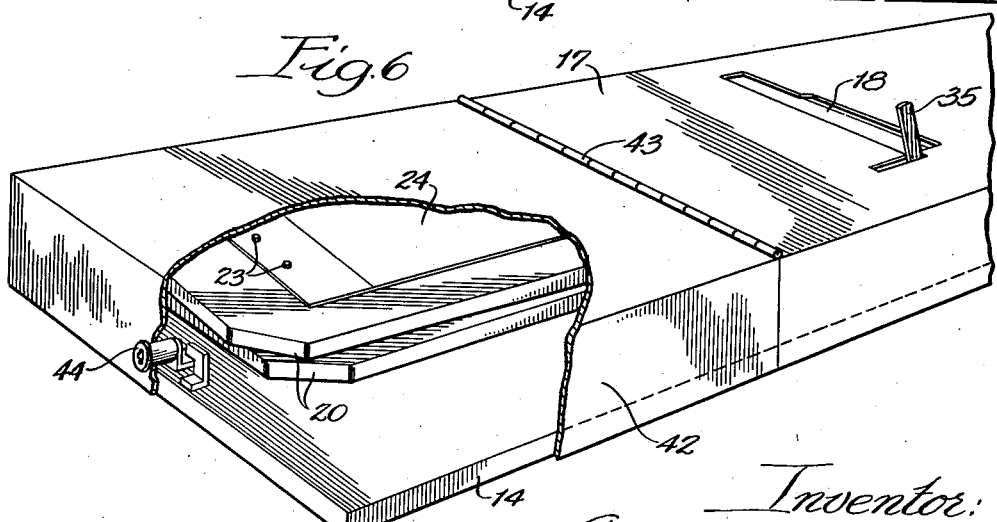

Patented Aug. 1, 1939

2,168,001

UNITED STATES PATENT OFFICE 2,168,001

ACCOUNTS REGISTER

Arthur C. Schroeder, Chicago Heights, Ill.

Application October 3, 1938, Serial No. 232,945

4 Claims. (Cl. 282—8)

This invention relates to accounts registers and has for its object to provide an improved accounts register.

A further object of the invention is to provide an improved accounts register in which entries can readily be made manually upon a severable strip and copies thereof simultaneously made upon master sheets.

A further object of the invention is to provide an accounts register in which the severable transaction slips and master sheets with necessary carbon papers can be made up in pads and mounted on trays for instantaneous insertion into the register.

A further object of the invention is to provide an accounts register in which master sheets of convenient size can be automatically advanced in the register for the recording of successive transactions.

A further object of the invention is to provide an accounts register in which the portions of the master sheets upon which entries have been recorded are advanced beneath a shield and beyond the access of the operator as soon as the entries are recorded thereon, and before further entries can be made.

A further object of the invention is to provide an accounts register in which the master sheets are always instantly available for auditing, posting, and checking.

A further object of the invention is to provide an accounts register in which tablets composed of one or more master sheets and the accompanying severable transaction slips can be conveniently and readily inserted into the register and into position for making entries thereon.

A further object of the invention is to provide an accounts register in which the portions of the master sheets upon which transactions have been entered are protected against tampering or making of further entries thereon by the operator.

Other objects, advantages and capabilities of the invention will appear from the following description of a preferred embodiment thereof, taken in conjunction with the accompanying drawings in which:

Figure 1 is a plan view of the accounts register.

Fig. 2 is a sectional side view taken on the line 2—2 of Fig. 1, showing the elements of the accounts register in operating relation.

Fig. 3 is a sectional end view taken on the line 3—3 of Fig. 2, showing the advancing mechanism of the accounts register.

Fig. 4 is a fragmentary plan view of the register tray and pad.

Fig. 5 is a sectional side view of the register taken on the line 5—5 in Fig. 3, showing details of the advancing mechanism by which the register pad is forwarded within the register.

Fig. 6 is a fragmentary view of a modified form of register cabinet.

Referring to the drawings, the reference numeral 10 designates the cabinet of the accounts register. The cabinet is composed of suitable frame members, such as the end members 11, the side walls 12, the cover plate 13, and the bottom plate 14, shown in Figs. 2, 3 and 5. All of these members are solid and without openings except the cover plate 13, which is provided with openings 15 and 16.

Completely enclosing the sides and top of the cabinet is a shield 17, open at both ends but unbroken except for the irregular opening 18.

Beneath the shield 17 and mounted upon the cover plate 13 are a pair of guide rails 19, shown in Fig. 3, designed to receive the register pad tray.

The register pad tray is shown in detail in Fig. 4 and in section in Figs. 2 and 3. It consists of a flat bed plate 20, cut away on its lower surface so that the lateral edges form runners 21 upon which the tray rides in its passage over the cover plate 13. The edges of the tray are closely embraced by the guide rails 19, which confine the tray beneath the shield 17 and position the tray with respect to its operating mechanism and the opening 18 in the shield. Mounted in the middle of the lower surface of the tray is a rack 22, its teeth projecting downwardly.

On the upper surface of the tray are means to secure a pad 24 to the tray and position it thereon, shown in Fig. 4 as small studs 23. These studs not only hold the pad on the tray, but register the pad with respect to the opening 18 in the shield 17.

The pad 24 is of such a length that whenever the tray 20 is placed beneath the shield 17 of the register, no part of the pad will project from beneath either end of the register shield 17. The pad is composed of a series of severable transaction slips 25 secured by an adhesive along one edge to one or more master sheets mounted thereunder. The severable transaction slips are of approximately the size of the opening 18 in the shield 17 so that only one of the slips can be exposed through the opening 18 at any time.

The severable transaction slips may be parts of a single sheet perforated so that they can readily be severed from each other, or they may be separate slips secured to the pad along one edge and laid either with their respective edges adjacent each other or partially overlapping each other as shown in Fig. 4. The accounts register operates identically with either type of pad but the advancing mechanism by which the severable transaction slips are successively exposed must be adjusted according to the type of severable transaction slips employed.

In Fig. 4 the pad is shown as made up of these severable transaction slips 25 in overlapping relation, a carbon paper 26, a master sheet 27 to receive the first carbon impression, a second carbon paper 28, and a second master sheet 29 to receive the second carbon impression. The pads may contain carbon papers and master sheets as required.

The severable transaction slips 25 are shown without any ruling thereon but my invention contemplates that they shall be ruled to provide suitable spaces for the entries intended to be recorded thereon according to the requirements of the business in which the accounts register is employed.

Within the register cabinet 10 is a pinion 30 toothed upon its periphery to engage the rack 22. The pinion 30 is mounted upon and secured to the shaft 31 which is journaled in the bearings 32 within the register cabinet. As shown in Fig. 5, on one end of the shaft 31 is fixedly mounted the ratchet 33. This ratchet is engaged by the pawl 34 pivotally mounted upon the lever 35. The lever 35 is in turn pivoted upon the shaft 31.

Also engaging the ratchet 33 is the pawl 36 pivoted upon the block 37 which is secured through the mounting 38 to the under surface of the cover plate 13 of the register cabinet. This pawl permits the ratchet 33 to be moved only in the direction indicated by the arrow in Fig. 5. Pawls 34 and 36 are forced into engagement with the teeth of the ratchet 33 by the springs 39 and 40.

The pinion 30 and the lever 35 project through the cover plate 13 through the openings 15 and 16. The lever 35 also projects through the shield 17, through the opening 18. Beneath the shield 17 and mounted upon the cover plate 13 is an adjustable stop member 41 which may be adjusted so that the stroke of the lever 35 measured between the stop 41 and the far end of the slot in which the lever 35 moves will advance the ratchet 33 exactly the distance necessary to advance the tray 20 to completely expose one of the severable transaction slips 25. If overlapping severable transaction slips as shown in Fig. 4 are employed, the distance which the tray is advanced will necessarily be less than the width of one of the slips, but if the slips employed are not overlapping, the tray will be advanced a distance equal to the width of one of the slips.

The operation of the accounts register is as follows. A tray 20 containing a pad 24 is inserted beneath the shield 17 by sliding the tray 20 between the guide rails 19. As soon as the tray 20 has been wholly inserted beneath the shield 17 the rack 22 is engaged by the pinion 30. Thereupon movement of the lever 35 transmitted through the pawl 34, ratchet 33, shaft 31, pinion 30 and rack 22, will expose a single severable transaction slip 25 through the opening 18 in the shield 17. In this condition the register is ready for operation. As soon as the operator enters the appropriate data upon the severable transaction slip 25 and simultaneously upon the accompanying master sheets 27 and 29, the severable transaction slip 25 may be lifted by one of its corners and torn from the pad 24 to which each slip is secured in the usual manner by adhesive along one edge thereupon. To prepare the register for further entries, the lever 35 must again be advanced a single stroke. This stroke of the lever 35 will again advance the tray 20 a sufficient distance to expose the next of the series of severable transaction slips 25 beneath the opening 18 and will simultaneously advance that portion of the master sheet upon which the previous entry was recorded by carbon impression beneath the shield 17 and away from the opening 18 therein. The master sheet with the carbon impressions of previous entries will thus be carried beyond access of the operator and will remain concealed and inaccessible beneath the shield 17 until the tray 20 is removed from the cabinet register. Thus as long as the tray 20 is in operating position within the cabinet register all entries made upon the master sheets 27 and 29 cannot be tampered with either intentionally or in error. The master sheet will thus contain only entries of individual transactions.

After successive operations of the lever 35 and the use of all severable transaction slips 25 upon a single pad, the tray 20 will project slightly beyond the shield 17 and can thereupon be removed from the register. The carbon papers 26 and 28 completely cover and conceal all entries made upon the master sheets 27 and 29. Not only are the entries concealed but the positions upon the master sheets of the respective entries are concealed.

In this condition the tray is ready for delivery for auditing, checking and posting.

Similar trays 20 can be prepared in advance of the day's work with the necessary pads 24 and the operator of the accounts register may have several of these trays with pads mounted thereon accessible and ready to be inserted into the machine. As soon as any pad 24 is exhausted the operator need merely insert another tray and the accounts register is thereupon ready for further operation.

In the embodiment of the invention shown in Fig. 6 the register cabinet 10 is lengthened by the addition of a second shield 42 which is hinged to the shield 17 of the cabinet register by means of the hinge 43. This second shield 42, together with the bottom plate 14 forms a completely enclosed compartment which may be provided with a lock 44. This compartment is sufficiently long so that as the trays 20 which have been advanced through the register are discharged from the forward end of the register, they fall within the compartment and can be removed only by a person provided with a key to the lock 44.

Although the invention has been disclosed in connection with the specific details of preferred embodiments thereof, it must be understood that such details are not intended to be limitative of the invention except insofar as set forth in the accompanying claims.

Having described my invention what I claim as new and desire to secure by Letters Patent is:

1. An accounts register comprising a cabinet, a shield mounted thereon, openings between said shield and said cabinet at the ends thereof, a tray slidable beneath said shield through said openings and above said cabinet, a pad mounted upon said tray consisting of a series of severable transaction slips and a master sheet, an opening in said shield to expose and permit the removal of a single severable transaction slip, manual means to advance said tray to expose successive transaction slips beneath said opening and means to prevent the retraction of said tray.

2. An accounts register comprising a cabinet, a shield covering all of said cabinet except the ends thereof, openings between said shield and said cabinet at the ends thereof, a tray slidable beneath said shield and above said cabinet, a pad mounted upon said tray consisting of a series of severable transaction slips and a master sheet, an opening in said shield to expose a single severable transaction slip, means to advance said tray to expose successive transaction slips beneath said opening and means to prevent retraction of said tray.

3. An accounts register comprising a cabinet, a shield covering all of said cabinet except the ends thereof, openings between said shield and said cabinet at the ends thereof, a tray to receive an account pad and slidable beneath said shield and through said end openings, an opening in said shield to expose a measured length of said tray, manual means to advance said tray a measured distance beneath said opening at each operation of said manual means, and means to prevent retraction of said tray.

4. An accounts register comprising a register cabinet, a shield mounted thereon, receiving and discharging openings between the shield and cabinet at the ends thereof, a pad carrier movable between said shield and said cabinet through said openings, a pad fixedly mounted on said carrier, an opening in said shield to expose a measured portion of said pad, means to advance said carrier to expose successive portions of said pad beneath said opening, and means to prevent retraction of said carrier.

ARTHUR C. SCHROEDER.